April 2, 1946.　　F. F. EHRENHAFT　　2,397,730
SHRINKAGE COMPENSATING MEANS
Filed July 20, 1945
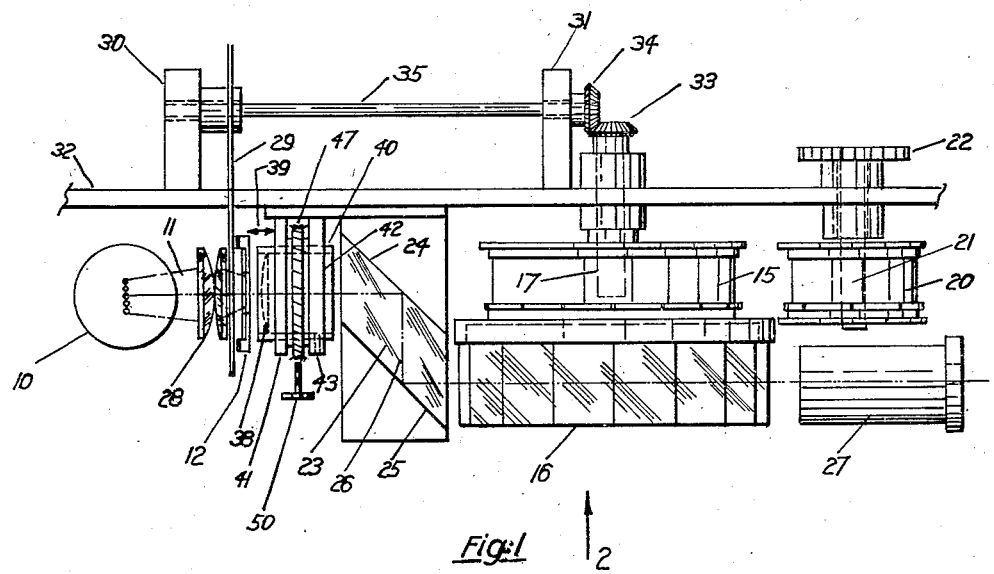
Fig:1
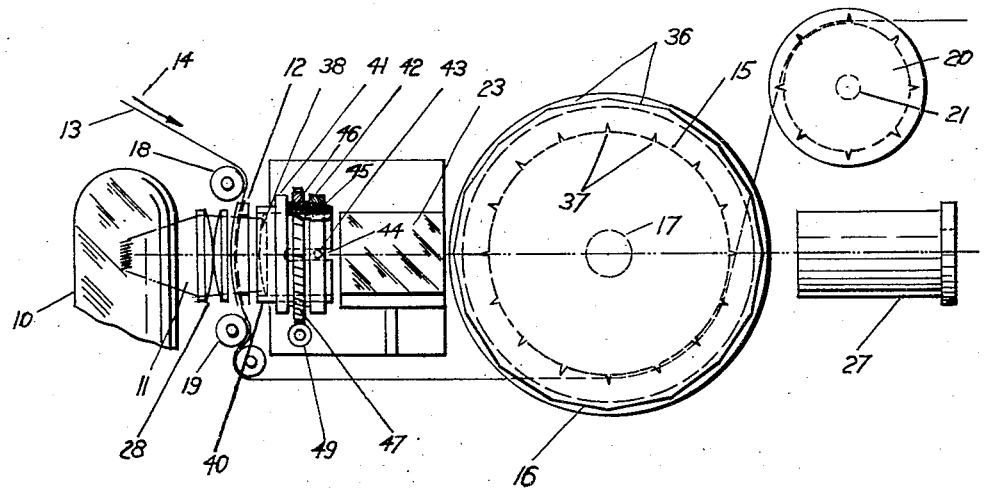
Fig:2
INVENTOR.
BY Franz F. Ehrenhaft Patented Apr. 2, 1946

2,397,730

UNITED STATES PATENT OFFICE 2,397,730

SHRINKAGE COMPENSATING MEANS

Franz F. Ehrenhaft, Forest Hills, N. Y.

Application July 20, 1945, Serial No. 606,188

20 Claims. (Cl. 88—16.8)

My present invention relates to cinematographic projectors equipped with optical compensating means and more particularly to means for compensating for shrinkage of the projected film combined with such projectors.

In cinematographic projectors of the above defined type the film is moved through the film gate with uniform speed and optical compensating means, preferably a rectifying prism, are used to compensate for this uniform film movement through the gate; in constructing such projectors it is of great importance to consider the fact that the projected film strips shrink, i. e. that after a certain period of storage and use they are shorter than at the time of their production.

It has already been proposed to prevent influence of this shrinkage on the steadiness of the projected images by means of a positive spherical lens arranged between the film gate and the rectifying prism and to adjust this lens by sliding the same in direction of the light beam passing through the gate and the prism.

I have found that such an adjusting lens can properly enlarge the film frames on the shrunk film so as to adjust the same to the size of the rectifying prism; it is, however, impossible to overcome by such a lens alone the lack of uniformity in the movement of the film through the film gate which is due to transportation of the shrunk film by a transporting sprocket the size of which does not correspond exactly to this shrunk film. Since the degree of shrinkage of film strips varies, it is evident that it is impossible to accurately adjust the transporting sprocket to all possible degrees of shrinkage of the film. Actually, it is advisable to compute the size of the transporting sprocket in such a manner that it corresponds exactly to a film being in greatly shrunk condition, i. e. that it takes care of possible maximal shrinkage of the film. Of course, this means that a film which has not shrunk at all or is only in slightly shrunk condition will be transported by such a sprocket with a certain unsteadiness which has to be avoided as far as possible if the projector has to come up to high requirements, as for instance when used for television purposes.

It is therefore an object of my present invention to construct a cinematographic projector of the above defined type in such a manner as to compensate for shrinkage of the film in a particularly simple way without complicated correcting and adjusting means.

Another object of my present invention is to avoid as far as possible influence of the shrinkage of the film upon the quality of the reproduced film images, i. e. to reduce such influence to such a degree that the unsteadiness of the projected images on the screen is within the tolerances which have to be accepted in any motion picture projection.

With the above objects in view, my present invention mainly consists in the combination of a rotatable rectifying prism arranged in the path of the projecting light beam and having a plurality of pairs of plane parallel faces with a positive spherical lens arranged in and normal to the path of the projecting light beam; in accordance with a preferred embodiment of my present invention, each two corresponding plane parallel faces of the rectifying prism have to be at a distance which corresponds to the height of the film frames on the film when the same is in slightly shrunk condition; furthermore, the positive lens mentioned above has to be arranged slidably in direction of the projecting light beam, preferably between the film gate and the rectifying prism.

The term "slightly shrunk condition" as used above and in the following description and claims is intended to define that the film has been subjected to average shrinkage, i. e. that its length has shrunk by about .2% of its original length.

I have found that my present invention is of particular importance for cinematographic projectors which are equipped with a rectifying prism rotated by a sprocket which is driven by the film after the same has passed through the film gate. In such a case, in accordance with my present invention the distance between each two consecutive sprocket teeth of the sprocket rotating the rectifying prism has to be equal to each other and to the distance of the perforations of the film when the same is in greatly shrunk condition. Despite this relatively great reduction of the sprocket size, in accordance with my invention the corresponding plane parallel faces of the prism driven by this sprocket have to be still at a distance as defined above, i. e. at a distance which corresponds to the height of the film frames on the film when the same is only in slightly shrunk condition.

I wish to note that the term "greatly shrunk condition" as used above and in the following description and claims, is intended to define a film after maximum shrinkage which amounts actually to about .5% of its original length.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Fig. 1 is a top view of a cinematographic projector according to my present invention; and Fig. 2 is a front view of the cinematographic projector shown in Fig. 1 seen in direction of arrow 2 of Fig. 1.

The cinematographic projector shown in the drawing comprises a light source 10 emitting a projecting light beam 11 passing through the film gate 12 arranged in the path of this light beam. This film gate 12 serves for guiding the film 13 during projection. The film is moving through this film gate 12 in direction of arrow 14 as indicated in Fig. 2.

The prism rotating and driving sprocket 15 is arranged in the plane of the movement of film 13 as shown in Fig. 1. The compensating prism 16 is arranged co-axially with this sprocket 15. Both sprocket 15 and prism 16 are carried by shaft 17 freely rotatably about a rotating axis arranged normal to the plane of the movement of film 13. In the embodiment shown, this axis of rotation also intersects the path of light beam 11. However, I wish to stress that shaft 17 might also be arranged spaced from the path of light beam 11, for instance as shown in my simultaneously filed U. S. Patent application Serial No. 606,187, entitled "Cinematographic projectors."

Near the two ends of the gate 12, I arrange the two freely rotatable guiding rollers 18 and 19 for guiding the film through the film gate.

The transporting sprocket 20 engages the film 13 after the same has engaged the prism driving sprocket 15. This transporting sprocket 20 is carried by shaft 21 and driven by the gear 22. This gear 22 in turn is driven by an electric motor or other driving means not shown in the drawing.

In order to direct the light beam 11, after the same has passed through the film 13 moving past film gate 12, through the rotating compensating prism 16, I provide light deflecting means, preferably a light deflecting prism 23 arranged between gate 12 and the prism 16. This light deflecting prism 23 has two reflecting faces 24 and 25 which reflect the light beam 11 as indicated by the broken line 26. As clearly shown in the drawing, the reflecting face 25 of prism 23 directs the light beam through the rotating compensating prism 16 and the projection lens 27.

Between light source 10 and film gate 12, I arrange besides the conventional condenser lens 28, if desired, also an equalizer member 29 having portions of different light transparency. This member 29 is shaped and constructed in such a manner that the translucency variations of its translucent portions are in accordance with the different cyclical variations in brightness of each different portion of the images on film 13. This member 29 is rotatably supported by brackets 30 and 31 mounted on wall 32. This wall carries also the bearings for shafts 17 and 21. Gear 33 mounted on shaft 17 and meshing with gear 34 mounted on shaft 35 carrying the equalizer member 29 serves for rotating the same in synchronism with the prism driving sprocket 15.

In accordance with my present invention, the plane parallel faces 36 of prism 16 are arranged in such a manner that the distance between each two corresponding, i. e. opposite plane parallel faces is equal to each other and corresponds to the height of the film frames of the film 13 when the same is in slightly shrunk condition. As mentioned above, the term "slightly shrunk condition" of the film indicates that its shrinkage is about .2%.

Accordingly, the distance between each two corresponding plane parallel faces of prism 16 has to be equal to $$\frac{b \cos \beta}{\sin (\alpha - \beta)}$$

wherein $b$ designates half of the center distance between each two consecutive film frames on the film 13 when the same is in slightly shrunk condition, $\alpha$ the maximum angle of incidence at which the light beam 11 enters prism 16 after being deflected by prism 23, and $\beta$ the corresponding angle of refraction of this prism. In view of what has been set forth above, this center distance between each two consecutive film frames on the slightly shrunk film has to be equal to about 998 thousandths of the corresponding center distance of the film frames on a new film before shrinkage.

Also in accordance with my present invention, the distance between each two consecutive sprocket teeth 37 on the prism driving sprocket 15 is equal to each other and to the distance of the perforations of the film when the same is in greatly shrunk condition. As mentioned above, the term "greatly shrunk condition" of the film indicates its maximum shrinkage which is about .5%. Accordingly, the distance between each two consecutive sprocket teeth of sprocket 15 has to be equal to about 995 thousandths of the distance of these teeth computed for a new film before shrinkage.

I wish to stress that although I discussed above only the distance between plane parallel faces 36 of prism 16 and the distance between consecutive sprocket teeth 37 of sprocket 15 and computation of these distances, it is self-evident that these distances determine the size of prism 16 and sprocket 15, respectively. This means that the actual diameters of prism 16 and sprocket 15 will be smaller than the theoretical diameters of a prism and a sprocket computed for a new film. The exact amount by which these theoretical diameters have to be reduced so as to obtain the actual diameters can be easily computed from the above defined distances between the plane parallel faces 36 of prism 16 and of the consecutive sprocket teeth 37 of sprocket 15, respectively.

It is evident that the actual shrinkage of film 13 cannot be predetermined in such a manner that the reduced prism size fully compensates for such shrinkage. Accordingly, as mentioned above, it is advisable to provide between film gate 12 and the deflecting prism 23 a magnifying member, preferably a positive spherical lens 38 arranged slidably in direction of arrow 39 between gate 12 and prism 23. This lens 38 has to be arranged normal to the direction of light beam 11, co-axially with the same.

In the embodiment shown in the drawing, lens 38 is mounted in tube 40 slidably carried by the two stationary bracket members 41 and 42. Bracket member 42 is provided with a hole in which pin 43 is inserted. This pin reaches into slot 44 in tube 40. This arrangement prevents turning of tube 40 and lens 38 relative to brackets 41 and 42 while not interfering with movement of this tube in axial direction, i. e. in direction of arrow 39.

The tubular member 40 is provided with the external screw thread 45 meshing with the internal screw thread 46 on gear 47; this gear is arranged freely turnably between brackets 41 and 42 as clearly shown in the drawing. The external thread 48 provided on gear 47 meshes with the worm gear 49 which latter is firmly connected with turning knob 50. By turning this knob 50, gear 47 is rotated, moving tube 40 and lens 38 mounted within the same in direction of arrow 39. Thus, it is possible to move lens 38 to and fro between gate 12 and deflecting prism 23 varying the ratio of magnification of this optical system according to the degree of shrinkage of various films.

As mentioned above, adjusting lens 38 has to compensate only for the difference between slightly and greatly shrunk film. Accordingly, I have found that a positive spherical lens having a power of between .2 and .5 diopter can be very well used for the purposes of my present invention.

It will be understood that each of the elements described above, or two or more together, may also find a useful application in other types of cinematographic projectors differing from the types described above.

While I have illustrated and described the invention as embodied in cinematographic projectors in which the rectifying prism is rotated by a film driven sprocket, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; and a positive spherical lens arranged in and normal to the path of said light beam slidably in direction of the same.

2. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; and a positive spherical lens arranged between said film gate and said combined light reflecting means in and normal to the path of said light beam slidably in direction of the same 3. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spherical lens arranged between said film gate and said combined light reflecting means in and normal to the path of said light beam slidably in direction of the same; and manually operable means for sliding said positive spherical lens in direction of said path of said light beam from a position near said film gate toward said combined light reflecting means and back.

4. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; a shaft carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; and optical magnifying means arranged in and normal to the path of said light beam slidably in direction of the same.

5. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged coaxially with said sprocket in the path of said light beam and having a plurality of pairs of plane parallel faces, the distance between each two corresponding plane parallel faces being equal to each other and corresponding to the height of said film frames on said film when the same is in slightly shrunk condition; a shaft carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; optical magnifying means arranged in and normal to the path of said light beam slidably in direction of the same; and manually operable means for sliding said optical magnifying means in direction of said path of said light beam.

6. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; a shaft carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; optical magnifying means arranged between said film gate and said combined light reflecting means in and normal to the path of said light beam slidably in direction of the same; and manually operable means for sliding said optical magnifying means in direction of said path of said light beam from a position near said film gate toward said combined light reflecting means and back.

7. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; and a positive spherical lens having a power of between .3 and .5 diopter and arranged in and normal to the path of said light beam slidably in direction of the same.

8. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and corresponding to the height of said film frames on said film when the same is in slightly shrunk condition; a shaft carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; optical magnifying means having a power of between .3 and .5 diopter and arranged in and normal to the path of said light beam slidably in direction of the same; and manually operable means for sliding said optical magnifying means in direction of said path of said light beam.

9. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and equal to $$\frac{b \cos \beta}{\sin (\alpha - \beta)}$$

wherein $b$ designates half of the center distance between each two consecutive film frames on said film when the same is in slightly shrunk condition, $\alpha$ the maximum angle of incidence at which said light beam enters said rotatable rectifying prism and $\beta$ the corresponding angle of refraction of said rectifying prism; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spherical lens arranged between said film gate and said combined light reflecting means in and normal to the path of said light beam slidably in direction of the same; and manually operable means for sliding said positive spherical lens in direction of said path of said light beam from a position near said film gate toward said combined light reflecting means and back.

10. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to the distance between each two consecutive perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and equal to $$\frac{b \cos \beta}{\sin (\alpha - \beta)}$$

wherein $b$ designates half of the center distance between each two consecutive film frames on said film when the same is in slightly shrunk condition, $\alpha$ the maximum angle of incidence at which said light beam enters said rotatable rectifying prism and $\beta$ the corresponding angle of refraction of said rectifying prism; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spherical lens arranged between said film gate and said combined light reflecting means in and normal to the path of said light beam slidably in direction of the same; and manually operable means for sliding said positive spherical lens in direction of said path of said light beam from a position near said film gate toward said combined light reflecting means and back.

11. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to each other and corresponding to the distance of the perforations of said film when the same is in greatly shrunk condition; a rectifying prism arranged co-axially with said sprocket in the path of said light beam and having a plurality of pairs of plane parallel faces, the distance between each two corresponding plane parallel faces being equal to each other and equal to $$\frac{b \cos \beta}{\sin (\alpha - \beta)}$$

wherein $b$ designates 998 thousandths of the center distance between each two consecutive film frames on said film when the same is in unshrunk condition, $\alpha$ the maximum angle of incidence at which said light beam enters said rotatable rectifying prism and $\beta$ the corresponding angle of refraction of said rectifying prism; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spherical lens arranged between said film gate and said combined light reflecting means in and normal to the path of said light beam slidably in direction of the same; and manually operable means for sliding said positive spherical lens in direction of said path of said light beam from a position near said film gate toward said combined light reflecting means and back.

12. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to 995 thousandths of the distance between each two consecutive perforations of said film when the same is in unshrunk condition; a rectifying prism arranged co-axially with said sprocket in the path of said light beam and having a plurality of pairs of plane parallel faces, the distance between each two corresponding plane parallel faces being equal to each other and equal to $$\frac{b \cos \beta}{\sin (\alpha - \beta)}$$

wherein $b$ designates 998 thousandths of the center distance between each two consecutive film frames on said film when the same is in unshrunk condition, $\alpha$ the maximum angle of incidence at which said light beam enters said rotatable rectifying prism and $\beta$ the corresponding angle of refraction of said rectifying prism; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spherical lens arranged between said film gate and said combined light reflecting means in and normal to the path of said light beam slidably in direction of the same; and manually operable means for sliding said positive spherical lens in direction of said path of said light beam from a position near said film gate toward said combined light reflecting means and back.

13. In a cinematographic projector, in combination, a light source emitting a projecting light beam; a film gate arranged in the path of said light beam and adapted to guide a film provided with consecutive film frames during movement of said film through said film gate; a sprocket having sprocket teeth and being arranged in the plane of said movement of said film through said film gate in such a manner as to engage said film after the same has moved through said film gate, the distance between each two consecutive sprocket teeth of said sprocket being equal to 995 thousandths of the distance between each two consecutive perforations of said film when the same is in unshrunk condition; a rectifying prism arranged co-axially with said sprocket in the path of said light beam and having a plurality of pairs of plane parallel faces, the distance between each two corresponding plane parallel faces being equal to each other and equal to $$\frac{b \cos \beta}{\sin (\alpha - \beta)}$$

wherein $b$ designates 998 thousandths of the center distance between each two consecutive film frames on said film when the same is in unshrunk condition, $\alpha$ the maximum angle of incidence at which said light beam enters said rotatable rectifying prism and $\beta$ the corresponding angle of refraction of said rectifying prism; means carrying both said sprocket and said rectifying prism rotatably about a common axis being normal to said plane of movement of said film through said film gate; combined light reflecting means arranged in said path of said light beam after the same has passed through said film gate reflecting said light beam through said rectifying prism in a plane being parallel to said plane of movement of said film through said film gate; a positive spheri-lens having a power of between .3 and .5 diopter arranged in and normal to the path of said light beam slidably in direction of the same; and manually operable means for sliding said positive spherical lens in direction of said path of said light beam from a position near said film gate toward said combined light reflecting means and back.

14. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, and a positive spherical lens arranged in and normal to the path of said light beam between the path of said film and said rotatable rectifying prism slidably in direction of said path of said light beam.

15. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, a positive spherical lens arranged in and normal to the path of said light beam between the path of said film and said rotatable rectifying prism, and manually operated means for sliding said positive spherical lens in direction of the path of said light beam from a position near the path of said film toward said rotatable compensating prism and back.

16. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, optical magnifying means arranged in and normal to the path of said light beam between the path of said film and said rotatable rectifying prism, and manually operated means for sliding said optical magnifying means in direction of said path of said light beam.

17. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, optical magnifying means arranged in and normal to the path of said light beam between the path of said film and said rotatable rectifying prism, and manually operated means for sliding said optical magnifying means in direction of said path of said light beam from a position substantially in the path of said film toward said rotatable optical compensating means and back.

18. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, and a positive spherical lens having a power of about .5 diopters arranged in and normal to the path of said light beam between the path of said film and said rotatable rectifying prism slidably in direction of said path of said light beam.

19. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than the distance which corresponds to the height of said film frames on said film when the same is in unshrunk condition, a positive spherical lens having a power of about .5 diopters arranged in and normal to the path of said light beam between the path of said film and said rotatable rectifying prism, and manually operated means for sliding said positive spherical lens in direction of the path of said light beam from a position near the path of said film toward said rotatable compensating prism and back.

20. In a cinematographic projector, a light source emitting a light beam, means for moving a film provided with a series of consecutive film frames with uniform speed normal through the path of said light beam, a rotatable rectifying prism arranged in the path of said light beam and having a plurality of pairs of plane-parallel faces, the distance between each two corresponding plane-parallel faces being equal to each other and slightly smaller than $$\frac{b \cos \beta}{\sin (\alpha - \beta)}$$

wherein $b$ designates half of the center distance between each two consecutive film frames on said film, $\alpha$ the maximum angle of incidence at which said light beam enters said rotatable rectifying prism and $\beta$ the corresponding angle of refraction of said rectifying prism, and a positive spherical lens arranged in and normal to the path of said light beam between the path of said film and said rotatable rectifying prism slidably in direction of the path of said light beam from a position near the path of said film toward said rotatable rectifying prism and back.

FRANZ F. EHRENHAFT.